`US005666891A`

United States Patent [19]
Titus et al.

[11] Patent Number: 5,666,891
[45] Date of Patent: Sep. 16, 1997

[54] ARC PLASMA-MELTER ELECTRO CONVERSION SYSTEM FOR WASTE TREATMENT AND RESOURCE RECOVERY

[75] Inventors: Charles H. Titus, Newton Square, Pa.; Daniel R. Cohn, Chestnut Hill, Mass.; Jeffrey E. Surma, Kennewick, Wash.

[73] Assignee: Battelle Memorial Institute, Richland, Wash.

[21] Appl. No.: 382,730

[22] Filed: Feb. 2, 1995

[51] Int. Cl.$^6$ .................................................... F23G 5/00
[52] U.S. Cl. ................... 110/250; 110/346; 219/121.38; 219/121.17
[58] Field of Search .................... 110/287, 250, 110/257, 346; 588/201; 219/121.16, 121.17, 121.38

[56] References Cited

U.S. PATENT DOCUMENTS

| | | |
|---|---|---|
| 2,927,143 | 3/1960 | Jensen . |
| 3,104,352 | 9/1963 | Tiemann . |
| 3,436,641 | 4/1969 | Biringer . |
| 3,470,444 | 9/1969 | Bixby . |
| 3,767,831 | 10/1973 | Plockinger et al. . |
| 3,779,182 | 12/1973 | Camacho . |
| 3,789,127 | 1/1974 | Bowman . |
| 3,812,620 | 5/1974 | Titus et al. . |
| 3,841,239 | 10/1974 | Nakamura et al. . |
| 3,918,374 | 11/1975 | Yamamoto et al. ............... 110/250 X |
| 3,995,100 | 11/1976 | Jäeger . |
| 4,099,227 | 7/1978 | Liptak . |
| 4,105,437 | 8/1978 | Liu . |

(List continued on next page.)

FOREIGN PATENT DOCUMENTS

| | | |
|---|---|---|
| 0096538 | 12/1983 | European Pat. Off. . |
| WO 87/05575 | 9/1987 | U.S.S.R. . |
| WO 87/05775 | 9/1987 | U.S.S.R. . |

OTHER PUBLICATIONS

"The Solid Waste Dilemma: An Agenda for Action", Toxic Subst. J., vol. 9, No. 1, pp. 9–54 (1989).

Carter et al., "Municipal Solid Waste Feasibility of Gasification Plasma Arc, Industrial and Environmental Applications of Plasma", Proceedings of the First International EPRI Plasma Symposium, CMP Report No. 90–9, pp. 13-1-13-13 (Mar. 1990).

Buelt et al., "In Situ Vitrification of Transuranic Waste: An Updated Systems Evaluation and Applications Assessment", PNL-4800 Supp. 1, pp. ix–xiv and 79–86 (Mar. 1987).

Denison et al., "Recycling & Incineration: Evaluating the Choices", pp. 104–145 and 177–200 (1990).

Graef et al., "Product Distribution in the Rapid Pyrolysis of Biomass/Lignin for Production of Acetylene", American Chemical Society, pp. 293–312 (1981).

(List continued on next page.)

*Primary Examiner*—Denise L. Ferensic
*Assistant Examiner*—Susanne C. Tinker
*Attorney, Agent, or Firm*—Choate, Hall & Stewart

[57] ABSTRACT

The present invention provides a relatively compact and highly robust waste-to-energy conversion system and apparatus which has the advantage of complete or substantially complete conversion of a wide range of waste streams into useful gas and a stable, nonleachable solid product at a single location with greatly reduced air pollution to meet air quality standards. The gas may be utilized in a combustion process to generate electricity and the solid product can be suitable for various commercial applications. Alternatively, the solid product stream, which is a safe, stable material, may be disposed of without special considerations as hazardous material. In one embodiment of the invention, the conversion system includes an arc plasma furnace directly coupled to a joule heated melter. In an alternative and preferred embodiment of the invention, the arc plasma furnace and joule heated melter are formed as a completely integrated unit having circuit arrangements for the simultaneous operation of both the arc plasma and the joule heated portions of the unit without interference with one another. The apparatus may additionally be employed without further use of the gases generated by the conversion process.

48 Claims, 6 Drawing Sheets

U.S. PATENT DOCUMENTS

| | | |
|---|---|---|
| 4,110,821 | 8/1978 | Hisano et al. . |
| 4,326,842 | 4/1982 | Adachi et al. . |
| 4,431,612 | 2/1984 | Bell et al. . |
| 4,461,010 | 7/1984 | Titus . |
| 4,466,824 | 8/1984 | Gauvin et al. . |
| 4,644,877 | 2/1987 | Barton et al. . |
| 4,766,598 | 8/1988 | Titus et al. . |
| 4,802,919 | 2/1989 | Fey ................................................. 75/25 |
| 4,818,836 | 4/1989 | Bebber et al. . |
| 4,895,678 | 1/1990 | Ohtsuka et al. ..................... 110/237 X |
| 4,922,099 | 5/1990 | Masuda et al. ........................... 250/324 |
| 5,095,828 | 3/1992 | Holden et al. . |
| 5,280,757 | 1/1994 | Carter et al. . |
| 5,284,503 | 2/1994 | Bitler et al. . |
| 5,370,724 | 12/1994 | Bitler et al. . |
| 5,451,738 | 9/1995 | Alvi et al. . |
| 5,484,978 | 1/1996 | Hedberg et al. . |

OTHER PUBLICATIONS

Johansson et al., "Renewable Energy: Sources for Fuels and Electricity", Island Press, pp. 726–747 (1993).

Hamrick, "Biomass–fueled Gas Turbines", Clean Energy From Waste and Coal, ACS Symposium Series 515, American Chemical Society, pp. 78–89 (1993).

Chapman, "Evaluation of Vitrifying Municipal Incinerator Ash", Ceramic Transactions: Nuclear Waste Management IV, Ceramic Transactions, American Chemical Society, vol. 23, pp. 223–233 and 349–394 (1991).

Bitler et al., U.S. patent application Ser. No. 08/274,829, "Process for Remediation of Lead—Contaminated Soil and Waste Battery Casings".

Bitler et al., U.S. patent application Ser. No. 08/149,343, "Process and System for the On–Site Remediation of Lead Contaminated Soil and Waste Battery Casings".

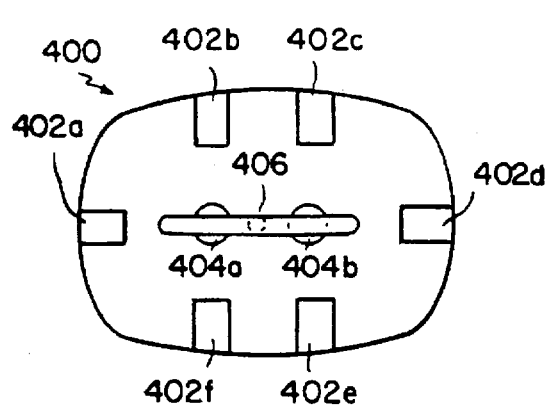
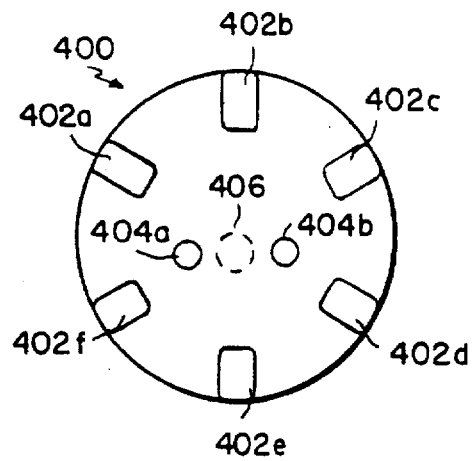
FIG. 7(a)    FIG. 7(b)
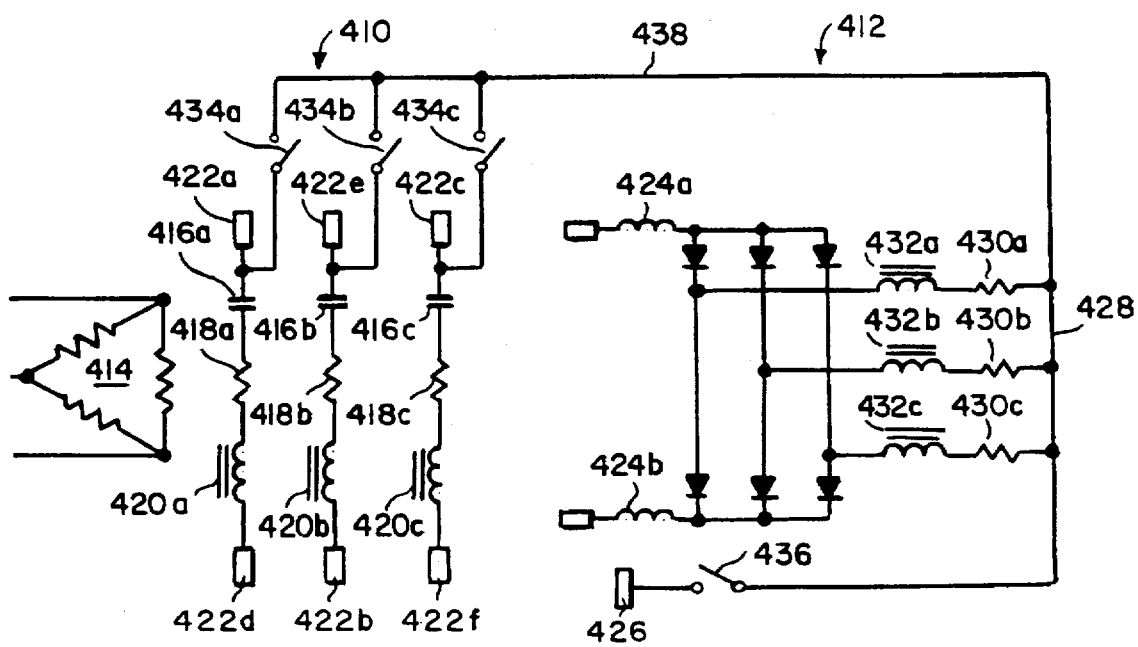
FIG. 8

ARC PLASMA-MELTER ELECTRO CONVERSION SYSTEM FOR WASTE TREATMENT AND RESOURCE RECOVERY

TECHNICAL FIELD

The present invention generally relates to systems for waste conversion, and more particularly to arc plasmas in conjunction with joule heated melters as integrated systems to provide a waste treatment and power production facility.

BACKGROUND OF THE INVENTION

The disposal of municipal solid waste (MSW) and other waste has become a major issue over the past few decades due to space limitations for landfills and problems associated with siting new incinerators. In addition, increased environmental awareness has resulted in a major concern of many large metropolitan areas and to the country as a whole to ensure that the disposal of solid waste is properly handled. See e.g., USA EPA, The Solid Waste Dilemma: An Agenda for Action, EPA/530-SW-89-019, Washington, D.C. (1989).

Attempts have been made to reduce the volume and recover the energy content of MSW through incineration and cogeneration. The standard waste-to-energy incinerator will process the solid combustible fraction of the waste stream, produce steam to drive a steam turbine, and as a result of the combustion process produce a waste ash material. Typically, the ash is buried in a municipal landfill. Current trends and recent rulings, however, may require such material to be shipped to landfills permitted for hazardous waste. This will substantially increase ash disposal costs. Moreover, there is increased public concern about gaseous emissions from landfills and the possibility of contamination of groundwater. Another disadvantage associated with incinerator systems is the production of large quantities of gaseous emissions resulting in the need for costly air pollution control systems in an attempt to decrease emission levels to comply with requirements imposed by regulatory agencies.

In order to overcome the shortcomings associated with incinerator systems, attempts have been made in the prior art to utilize arc plasma torches to destroy toxic wastes. The use of arc plasma torches provides an advantage over traditional incinerator or combustion processes under certain operating conditions because the volume of gaseous products formed from the plasma arc torch may be significantly less than the volume produced during typical incineration or combustion and under some circumstances the waste material can be glassified.

For example, U.S. Pat. No. 5,280,757 to Carter et al. discloses the use of a plasma arc torch in a reactor vessel to gasify municipal solid waste. A product having a medium quality gas and a slag with a lower toxic element leachability is produced thereby.

U.S. Pat. No. 4,644,877 to Barton et al. relates to pyrolytic destruction of polychlorinated biphenyls (PCBs) using a plasma arc torch. Waste materials are atomized and ionized by a plasma arc torch and are then cooled and recombined into gas and particulate matter in a reaction chamber. U.S. Pat. No. 4,431,612 to Bell et al. discusses a hollow graphite electrode transfer arc plasma furnace for treatment of hazardous wastes such as PCBs.

A process for remediation of lead-contaminated soil and waste battery material is disclosed in U.S. Pat. No. 5,284,503 to Bitler et al. A vitrified slag is formed from the soil. Combustible gas and volatized lead, which are formed from the waste battery casings, are preferably transferred to and used as a fuel for a conventional smelting furnace.

The systems proposed by Barton et al., Bell et al., Carter et al., and Bitler et al. have significant disadvantages. For example, such disadvantages include insufficient heating, mixing and residence time to ensure high quality, nonleachable glass production for a wide range of waste feeds. Additionally, hearth size and feeder design are significantly limited since furnace walls must be relatively close to the arc plasma which is the only heat source. High thermal stress on the walls of the furnace often occurs as a result of the limitation on the hearth size.

Prior art arc plasma furnaces with metal electrodes further are limited by short electrode lifetime and available arc plasma power. Moreover, there are often difficulties associated with prior art transfer arc plasmas in start-up and restarting of such arc plasma systems when cold material is being processed.

Thus, while such attempts have been useful, there remains a need in the art for a robust, easy to operate waste conversion system which minimizes hazardous gaseous emissions and which converts a wide range of solid waste into useful energy and a product stream which is in a safe, stable form for commercial use or which does not require special hazardous waste considerations for disposal. It would therefore be desirable to provide a robust, user friendly and highly flexible method and apparatus for processing and converting a wide range of waste materials into useful energy and stable products while minimizing hazardous gaseous emissions, thereby overcoming the shortcomings associated with the prior art.

SUMMARY OF THE INVENTION

It is an object of the present invention to provide a method and apparatus for increased conversion of solid waste materials such as municipal and industrial waste to useful energy with greatly reduced air pollution.

It is another object of the present invention to provide a method and apparatus for converting a wide range of waste materials to useful commercial products or to a safe, stable product which is suitable for disposal.

It is still another object of the invention to provide a method and apparatus for converting waste materials using an arc plasma directly coupled to a joule heated melter as an integrated waste conversion system.

It is a further object of the invention to provide a method and apparatus for converting waste materials using a fully integrated joule heated melter and arc plasma unit.

It is yet a further object of the invention to provide a method and apparatus for converting waste materials in which a joule heated melter and an arc plasma in a fully integrated system are operated simultaneously.

It is yet a further object of the invention to provide a method and apparatus for vitrifying waste materials using an integrated joule heated melter and arc plasma system.

It is still a further object of the invention to provide a method and apparatus for converting waste materials using fast pyrolysis, thereby providing a high purity gas suitable for combustion.

It is yet a further object of the present invention to provide a method and apparatus for converting waste materials to gaseous fuel energy which is suitable for use in the production of electricity.

These and other objects of the invention are provided by a system which is capable of processing municipal solid waste (MSW), industrial waste or other waste forms into a stable nonleachable product which is suitable for use commercially or which can be disposed of without risk to the environment. The system also minimizes air emissions and maximizes production of a useful gas product for the production of electricity.

The present invention provides a compact waste-to-energy processing system that has the advantage of complete or substantially complete conversion of waste materials into a useful gas and a product stream at a single location. In addition, the product stream may be used in a variety of commercial applications. Alternatively, the product stream, which is in a safe, stable waste form, does not require special hazardous considerations for disposal.

One embodiment of the invention utilizes a combination of an arc plasma furnace directly coupled to a joule heated melter. The combination of the arc plasma furnace and the joule heated melter with gas turbine generating equipment provides a self-powered waste treatment and power production facility which is capable of being deployed in relatively small modular units and which can be easily scaled to handle large volumes of municipal solid waste.

The primary processing unit includes an AC or DC electrode arc in a furnace directly coupled to a melt chamber which has joule heating capability for the melt pool. Preferably, the electrode arc or arcs is a DC electrode arc or arcs with electrodes formed of graphite. The primary mode of operation of the arc plasma and joule heated melter is pyrolysis. In a preferred embodiment, the system is operated such that fast pyrolysis occurs, thereby producing a gas with higher purity as compared with other methods of pyrolysis.

Graphite is the preferred electrode material rather than metal since graphite electrodes simplify the process and since graphite has much higher current capability than a metal electrode in a torch. In addition, graphite electrodes require less maintenance relative to the frequent tip replacements of the metal torch systems.

In another preferred embodiment of the present invention, a system is provided for fully integrating the arc plasma and joule heated melter such that the system is capable of simultaneous operation of these components. The fully integrated system provides a significant improvement over prior art vitrification techniques and is suitable for use for a wide range of treatment applications and other vitrification requirements. The benefits of this embodiment of the invention include high processing rates for a large variety of materials and reduced volume requirements due to the integrated system. Additionally, the joule heated melter is capable of maintaining a constant temperature melt with good mixing characteristics when integrated with an electric arc system, thereby resulting in a high quality, homogenous glass product. The arc technology provides the necessary energy for vitrifying material in a very efficient manner and at significantly higher rates than other technologies. Simultaneous operation of the arc plasma and joule heated melter is provided by predetermined arc melter configurations and electrical circuits.

The use of the melter in combination with the arc plasma provides more uniform heating than prior art techniques. In addition, the present invention ensures production of a high quality, nonleachable glass product. The present invention greatly facilitates ease of operation and provides a constant heat source necessary to maintain sufficient material conductivity for rapid restart. Moreover, the furnace walls may be further from the arc plasma since there is an additional heat source provided. The increase in wall distance from the arc plasma increases feed options and reduces thermal stress on the furnace lining. The present invention also allows the use of electrodes having a long life and a very wide range of arc plasma power levels.

The high quality, vitrified products produced in accordance with the present invention may be used in a variety of applications. For example, the vitrified products may be crushed and incorporated into asphalt for use in roads and the like. Alternatively, the vitrified products may be utilized to replace cinder in cinder or building blocks, thereby minimizing absorption of water within the block. Further, the vitrified products may be solidified to a final form which exhibits substantial volume reduction over prior art vitrification products. The solidified form is suitable for disposal without health risks or risks to the environment.

The foregoing has outlined some of the more pertinent objects of the present invention. These objects should be construed to be merely illustrative of some of the more prominent features and applications of the invention. Many other beneficial results can be attained by applying the disclosed invention in a different manner of modifying the invention as will be described. Accordingly, other objects and a fuller understanding of the invention may be had by referring to the following Detailed Description of the Preferred Embodiments.

BRIEF DESCRIPTION OF THE DRAWINGS

For a fuller understanding of the present invention, reference is had to the following description taken in conjunction with the accompanying drawings, in which:

FIGS. 7(a) and 7(b) show two plan views for electrode configurations and geometries for the integrated system shown in FIG. 5; and FIG. 8 illustrates a circuit diagram having the ability to switch electrodes from AC to DC operation according to the integrated system shown in FIG. 5.

Similar reference characters refer to similar parts throughout the several views of the drawings.

DETAILED DESCRIPTION OF THE PREFERRED EMBODIMENTS

Figure 1:
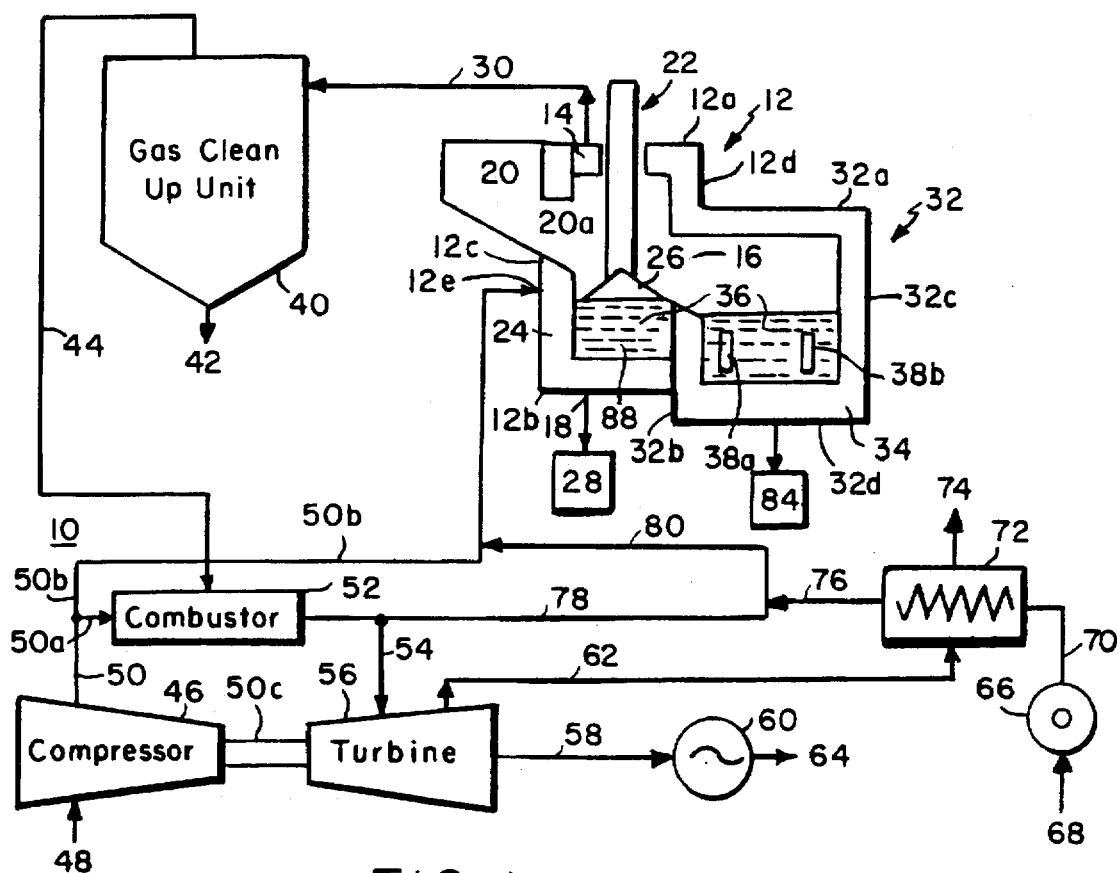
FIG. 1 is a schematic view of a flow diagram illustrating the process and apparatus suitable for use in the present invention.

Referring now to FIG. 1, a schematic view of the process and apparatus suitable for use in accordance with the present invention is shown. System 10 includes a primary processing unit having arc plasma furnace 12 and melt chamber 32. As shown in greater detail in FIG. 2, arc plasma furnace 12 is constructed such that the amount of oxygen present in the furnace can be controlled. Furnace 12 includes top 12a, bottom 12b and sides 12c and 12d. In addition, furnace 12 preferably includes at least four ports, illustrated in FIG. 1 as 14, 16, 18 and 20a. As discussed herein, opening 14 allows gas formed in arc furnace 12 to be discharged through opening 14 to fuel gas line 30 and be processed for use as a fuel gas. Opening or gas discharge port 14 may be formed of any conventional material which allows controlled discharge of a combustible gas. For example and while not meant to be limiting, gas discharge from furnace 12 may be controlled by a flow control valve or the like at opening 14. It is preferred that gas discharge port 14 be positioned at or near top 12a of furnace 12. Alternatively, gas discharge port 14 may be positioned in chamber 32 as shown in FIG. 2.

Figure 2:
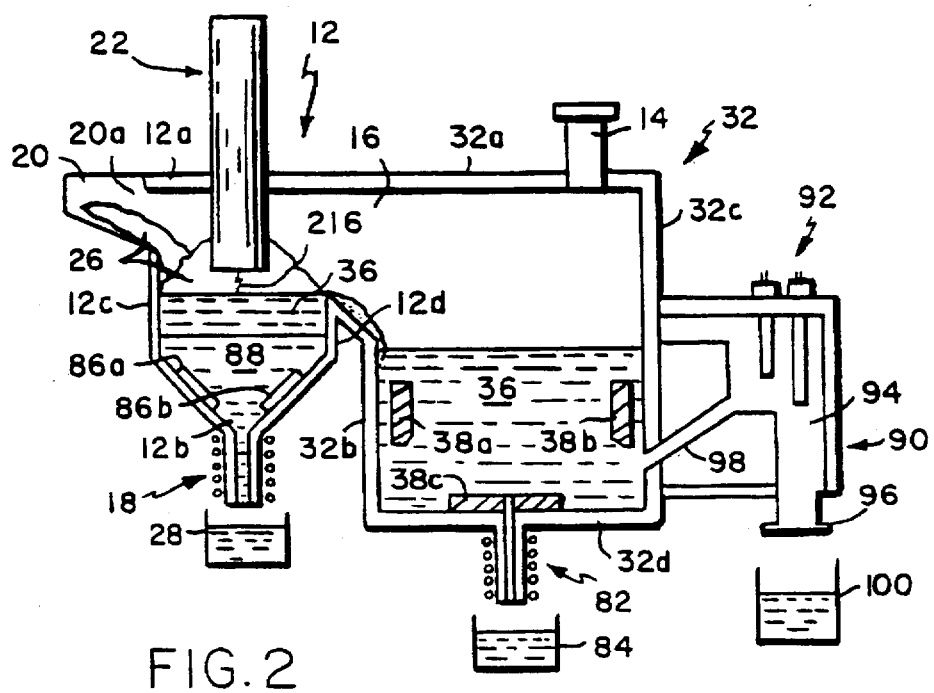
FIG. 2 illustrates a combined arc plasma furnace and joule heated melter in accordance with the present invention.

As further shown in FIGS. 1 and 2, opening 16 allows slag or glass material formed in furnace 12 to flow into joule heated melter 32. Flow through opening or port 16 is preferably controlled by constructing furnace 12 to have an angled wall 12d such as that shown in FIG. 2. In this manner, slag material 36 accumulates in furnace 12 until a predetermined level is reached, forcing slag 36 to flow over wall 12d and into melter 32. While not meant to be limiting, wall 12d may be formed at angle of about 45° as shown in FIG. 2. The level at which slag begins to flow over wall 12d into melter 32 is determined based on the desired residence time in the furnace and the composition of the waste feed material.

Opening or metal discharge port 18 allows metal which has formed and collected in furnace 12 to be discharged and separated from the gases and slag formed in furnace 12. Discharge port 18 is constructed in any manner which is capable of controlling the discharge of molten metal material from furnace 12. For example, a flow control valve or equipment may be used to control flow through discharge port 18 to metal collector 28. Preferably, opening 16 is positioned on side 12d of furnace 12 as shown in FIGS. 1 and 2 and metal discharge 18 is positioned at or near bottom 12b of furnace 12. While not meant to be limiting, furnace 12 may be designed such that bottom 12b is angled as shown in FIG. 2.

Waste material entry port 20a is positioned such that waste material 26 is fed from waste feed system 20 through port 20a to furnace 12 in a controlled manner. While not to be construed as limiting, port 20a may include a flow control valve or the like to monitor the feed rate of waste material 26. Feed system 20 may be any conventional type of feed system which is capable of feeding municipal solid waste or other waste such as hazardous waste, hospital waste, ash from an incinerator or the like to furnace 12 so long as the feed system does not allow air to enter the furnace through the feed system.

As shown in FIG. 1, furnace 12 may include additional ports such as air or gas entry port 12e, shown in FIG. 1. Air or gas entry port 12e includes flow control, such as a flow control valve or the like. Preferably, port 12e is positioned to enter through the furnace wall at a level proximate to slag material 36 as shown in FIG. 1. In this manner, air 50b (which may contain a predetermined amount of steam 80), is injected into furnace 12 at a controlled rate and time during the conversion process to control the composition of the gas exiting the furnace. In addition, air and/or steam may be introduced through opening 12e to ensure that any carbon in the feed material has been converted to carbon-containing gases such as CO, $CO_2$, $CH_4$ and the like. This reduces the mount of charring during the process which may result when carbon is not completely convened to carbon-containing gases.

Refractory 24 is utilized to line furnace 12. Refractory 24 may be formed of any suitable material capable of handling temperatures in excess of about 3000° C. For example and while not meant to be limiting, furnace 12 and portions of refractory 24 may be formed of ceramic or graphite.

Furnace 12 includes electrode or electrodes 22, which are preferably formed of graphite. It is preferred to use graphite as electrode material rather than metal since graphite electrodes simplify the process and have much higher current capability than a metal torch. In addition, graphite electrodes require less maintenance relative to the frequent tip replacements of the metal torch systems. Due to the anticipated conditions in the furnace plenum involving both partial oxidizing environments and conditions promoting the water-gas reaction:

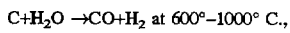

$C+H_2O \rightarrow CO+H_2$ at 600°–1000° C., there may be unacceptable consumption of graphite without special provisions. Therefore, graphite electrode 22 is preferably coated with zirconia, silicon carbide, boron nitride or another protective coating to minimize graphite consumption and prolong useful life. For example, when municipal solid waste containing carbonaceous material is fed to furnace 12, a highly endothermic reaction occurs requiring approximately 600 kW-hours/ton municipal solid waste to convert combustible material to fuel gas and incombustible material to slag.

Electrode or electrodes 22 may be operated with either an AC or DC arc in furnace 12. It is preferred however, to utilize a DC arc in furnace 12 rather than an AC arc as the use of a DC arc enhances arc stability. Metal, which may accumulate at the bottom of furnace 12, is capable of being removed through metal discharge port 18. Furnace 12 may also include one or more electrodes 86a, 86b preferably positioned at or near bottom 12b of furnace 12.

Melt chamber 32, which includes top 32a, bottom 32d and sides 32c and 32b, is joule heated and is preferably directly coupled to furnace 12. Joule heated melter 32 is heated using either AC or DC power. In a preferred embodiment, joule heated melter 32 is heated with AC power while arc electrode 22 utilizes DC power. The energy requirements to maintain slag 36 at the proper temperature are equal to the heat losses from the melter outer surface. This is expected to be very low, i.e., about 20–30 KW/$m^2$ of slag or glass surface area for a properly designed melt chamber. One advantage of having melter 32 closely coupled to arc furnace 12 is that melter 32 provides additional melt volume, thereby providing a longer residence time in the process. This results in a more homogeneous slag or glass product which is removed from system 10 by slag discharge port 82.

Refractory 34 acts as a lining for joule heated melter 32 and may be formed of any material capable of withstanding temperatures of about 1600° C. For example, refractory 34 may be formed of ceramic or the like. Electrodes 38a, 38b are preferably positioned in melter 32 such that when slag 36 enters melter 32, electrodes 38a and 38b are submerged therein. As shown in FIGS. 1 and 2 for example, electrode 38a may be placed on one side 32b of melter 32, while electrode 38b is placed on the opposite side 32c of melter 32 such that AC or DC current is capable of flowing therebetween. Preferably, electrodes 38a, 38b are positioned at or near the bottom 32d of melter 32. It should be noted, however, that any arrangement of electrodes 38a, 38b is suitable for use in accordance with the invention so long as sufficient current is capable of passing through slag 36. It should also be noted that melter 32 may also include additional electrodes 38c such as that shown in FIG. 2.

Melter 32 may also include auxiliary heater system 90. As illustrated in FIG. 2, auxiliary heater 90 includes one or more heaters 92, conduit 98, slag pouring conduit 94, port 96 and slag collector 100. Slag 36 flows from melter 32 through conduit 98, where it is heated by heaters 92. Slag 36 then flows through slag pouring conduit 94 to port 96 and is discharged therefrom to slag collector 100. Port 96 may include a flow control valve or the like to control the discharge of slag 36 from heat system 90. Auxiliary heater system 90 is utilized when it is desirable to decrease the viscosity of the slag in order to maintain the slag level in the melter. The auxiliary heater system also compensates for heat loss as the slag approaches the slag discharge prior to dropping into the slag container. As illustrated in FIG. 2, slag therefore may be collected in containers 84 and/or 100. When hazardous waste is being processed, it may be desirable to have containers 28, 84 and 100 sealably connected to ports 18, 82 and 96, respectively, in a manner such that air and/or gases do not enter or exit the system therethrough.

The process of the present invention will now be described. Waste material 26 is fed from feed system 20 through entry port 20a into furnace 12. As mentioned above, arc furnace 12 preferably includes graphite electrode or electrodes 22 operating with a DC arc. This arrangement is particularly suitable for processing solid waste material into glass or slag and a useful gas.

The arc in furnace 12 is preferably designed to contact directly feed material 26. Two types of power supply arrangements are suitable for use in the present invention to convert three phase AC power into DC power in order to initiate and maintain a stable DC arc in arc furnace 12.

Figure 3A:
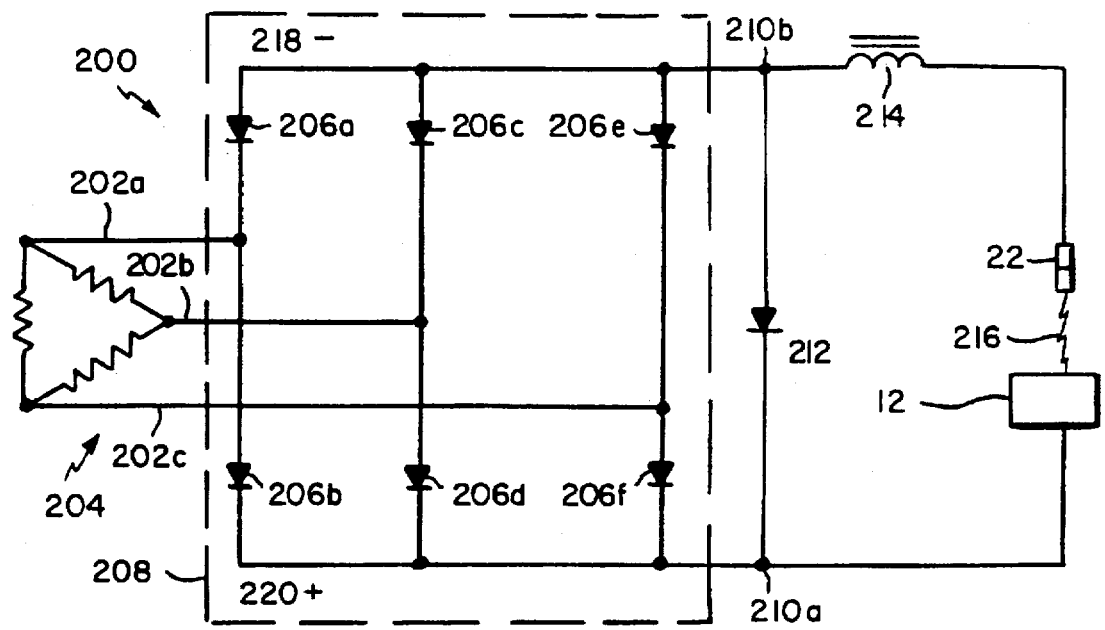
FIGS. 3(a) and 3(b) illustrate power system arrangements for the arc plasma portion of the combined arc plasma furnace and joule heated melter arrangement shown in FIG. 2.

As shown in FIG. 3(a), a conventional three phase thyristor bridge type rectifier 200 with a "floating" or "clamping" diode 212 is illustrated. Secondary transformer winding 204 provides an AC voltage to thyristors 206a, 206b which rectify first phase 202a. Similarly, secondary transformer winding 204 provides an AC voltage to thyristors 206c, 206d which rectify second phase 202b while secondary transformer winding 204 provides an AC voltage to thyristors 206e, 206f which rectify third phase 202c. In this manner, a rectified phase designated as 208 in FIG. 3(a) is provided across points 210a and 210b.

"Clamping" diode 212 is connected between (−) 218 and (+) 220 outputs of the bridge rectifier. Inductor 214 is connected in series with an ungrounded output cable between "clamping" diode 212 and arc furnace 12. Inductor 214 is used to supply transient voltage frequently required to maintain a stable arc 216 during operation of arc furnace 12. The function of "clamping" diode 212 is to provide a path for the current from inductor 214 to flow when the voltage of DC arc 216 exceeds the open circuit voltage of the rectifier.

Figure 3B:
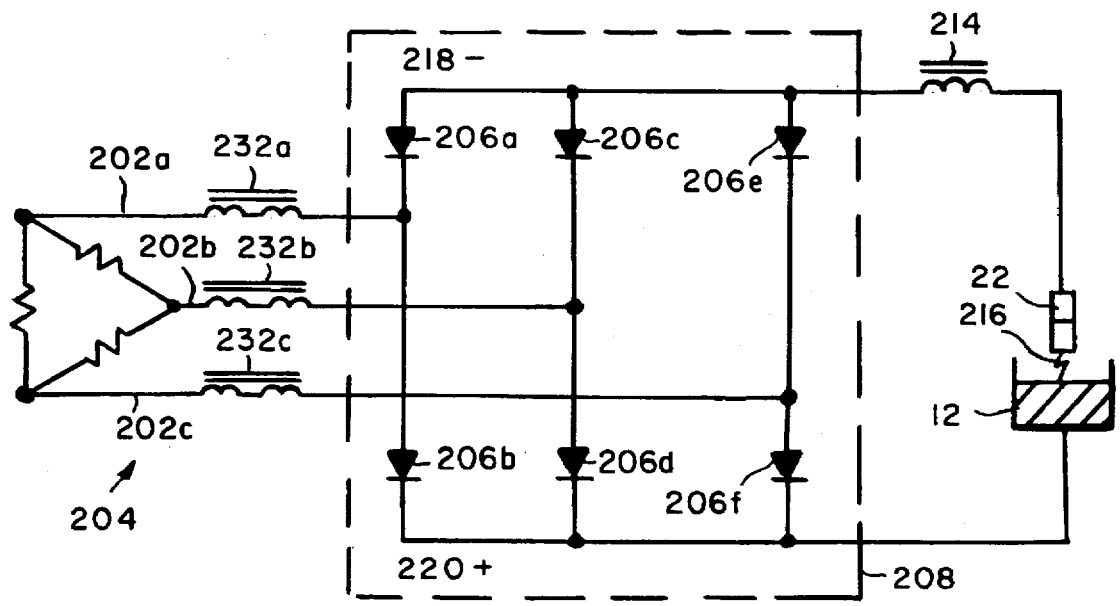

Referring now to FIG. 3(b), another conventional circuit 230 to convert three phase AC power to DC power which is suitable for use in the present invention is shown. This type of circuit is suitable for use in sustaining a DC arc 216 in furnace 12 and is frequently utilized in DC arc welding systems. In the circuit shown in FIG. 3(b), saturable reactors 232a, 232b and 232c are connected in series with each of the three AC secondary transformer windings and the three phase diode rectifier bridge. The function of saturable reactors 232a, 232b and 232c is to vary the impedance of the AC current path between the transformer and the AC input to the diode rectifier, thereby providing a means to maintain the desired amount of DC current in arc 216 even though the arc voltage may be varying rather rapidly.

Secondary winding 204 in circuit 230 shown in FIG. 3(b) may be wye or delta. If secondary winding 204 is wye, then the primary winding (not shown in FIG. 3(b)) must be delta or be wye with a neutral return.

A "clamping" diode is not necessary in the type of circuit shown in FIG. 3(b) because the diodes in the bridge rectifier provide this function. Inductor 214 is used to supply the arc voltage necessary in order to maintain a stable DC arc 216 in furnace 12.

It is important that either the thyristor type or saturable reactor type of rectifier have a sufficiently high open current DC voltage to normally exceed the DC arc voltage. It is also important that either type of power supply must be capable of holding a preset magnitude of DC current while the arc voltage ranges from zero to at least 90% of normal open circuit rectifier voltage even if the arc voltage is varying rapidly.

If arc furnace 12 is powered with AC rather than DC power, then the saturable reactor type of circuit shown in FIG. 3(b) is preferred since it will provide a greater degree of arc stability than a conventional thyristor type of AC switch.

Contact with the arc and the specific gravity of metals present in waste material 26 results in the formation of three phases or layers in furnace 12: a metal layer, a slag layer and a gaseous layer. Arc furnace 12 operates in a temperature range of about 1400°–2000° C., and preferably in the range of about 1550°–1600° C. based on the composition of the waste feed. The arc plasma operates in a temperature range of about 3500°–4500° C.

Metal layer or phase 88 accumulates in the bottom of furnace hearth 12b until a sufficient quantity is collected. Metal 88 is then discharged into a separate container through discharge port 18. As mentioned above, port 18 may be formed of any suitable material which is capable of handling metal in a temperature range of about 1400°–2000° C. Port 18 may also include a flow control valve or the like to control discharge of metal 88 from furnace 12. Glass or slag 36 produced in arc furnace 12 passes under a weir into joule heated melter 32 which is coupled to furnace 12. While the operating temperature in joule heated melter 32 may vary depending on the composition and properties of the slag, melter 32 is preferably operated at approximately 1200°–1600° C.

The primary mode of operation in furnace 12 and melter 32 is pyrolysis. However, operation in a partial oxidation mode may be required to assist in the processing of large quantities of combustible materials.

As further illustrated in FIG. 1, system 10 also includes turbine 56, generator 60, and the necessary equipment required to couple the arc furnace-melter unit thereto. For example, system 10 preferably includes hot gas cleaning equipment 40, waste heat recovery unit 72, and air 48 and water 68 injection systems. While not shown in FIG. 1, a feed conditioning process for waste material 26 in feed system 20 may also be utilized prior to being fed to furnace 12. In addition to the units shown in FIG. 1, it may be desirable to incorporate an off-gas scrubbing process for gases exiting the gas fired turbine to remove any acid gases therefrom. Preferably, the only gas conditioning required for the gases exiting arc furnace 12 is gas-solid separation in hot gas clean-up unit 40 to minimize the amount of particulates entering turbine 56.

The gases produced in furnace 12 are combustible gases formed as a result of fast pyrolysis. As discussed herein, fast pyrolysis generally results in at least 65% conversion of waste material to a useful gas for combustion. Arc furnace 12 utilized in accordance with the present invention is thus is expected to provide a gas containing about: 2% carbon dioxide, 44% carbon monoxide, 43% hydrogen, 2% methane and the balance being light hydrocarbons. The gas produced in furnace 12 is transported through line 30 to hot gas clean up unit 40 where ash 42 is removed and thus separated from fuel gas 44.

Intake air 48 enters compressor 46 and air 50 exiting compressor 46 may be divided into several delivery streams. For example, air flow 50c is fed to turbine 56, while air flow 50a is fed to combustor 52 and air flow 50b is fed to furnace 12.

Fuel gas 44 enters combustor 52 and combines with air 50a. Steam 54 produced in combustor 52 drives turbine 56 which is connected to generator 60 by stream 58 such that electricity 64 is thereby generated. Turbine 56 is preferably a steam-injected gas turbine.

Water 68 enters system 10 through pump 66 to heat recovery steam system 72, where flow 70 combines with turbine exit gas 62. Exhaust 74 is separated from steam 76 in heat recovery steam system 72. Steam 76 is preferably recycled as steam 78 to combustor 52 and as steam 80 to air flow 50b, as shown in FIG. 1 respectively.

Figure 4:
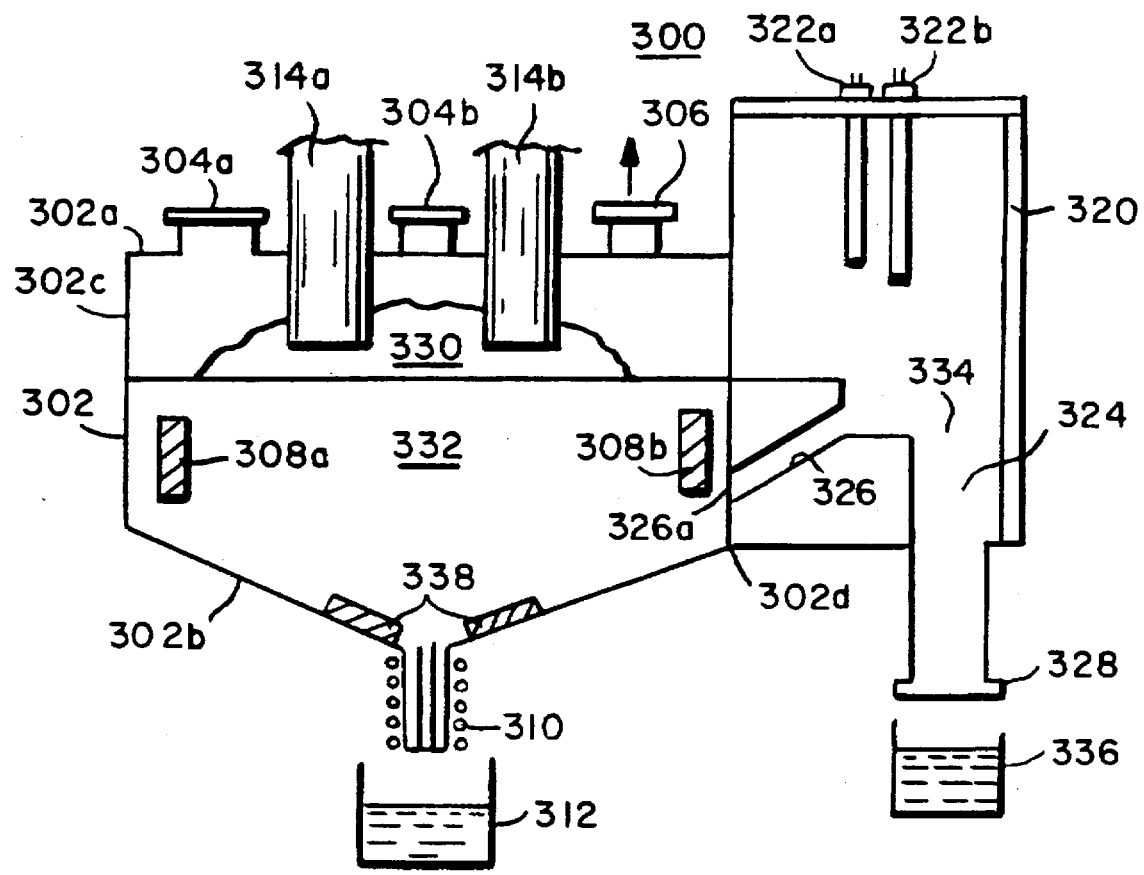
FIG. 4 shows an alternative and preferred embodiment of the arc plasma furnace and joule heated melter according to the present invention in which the furnace and melter are formed as an integrated system.
Figure 5:
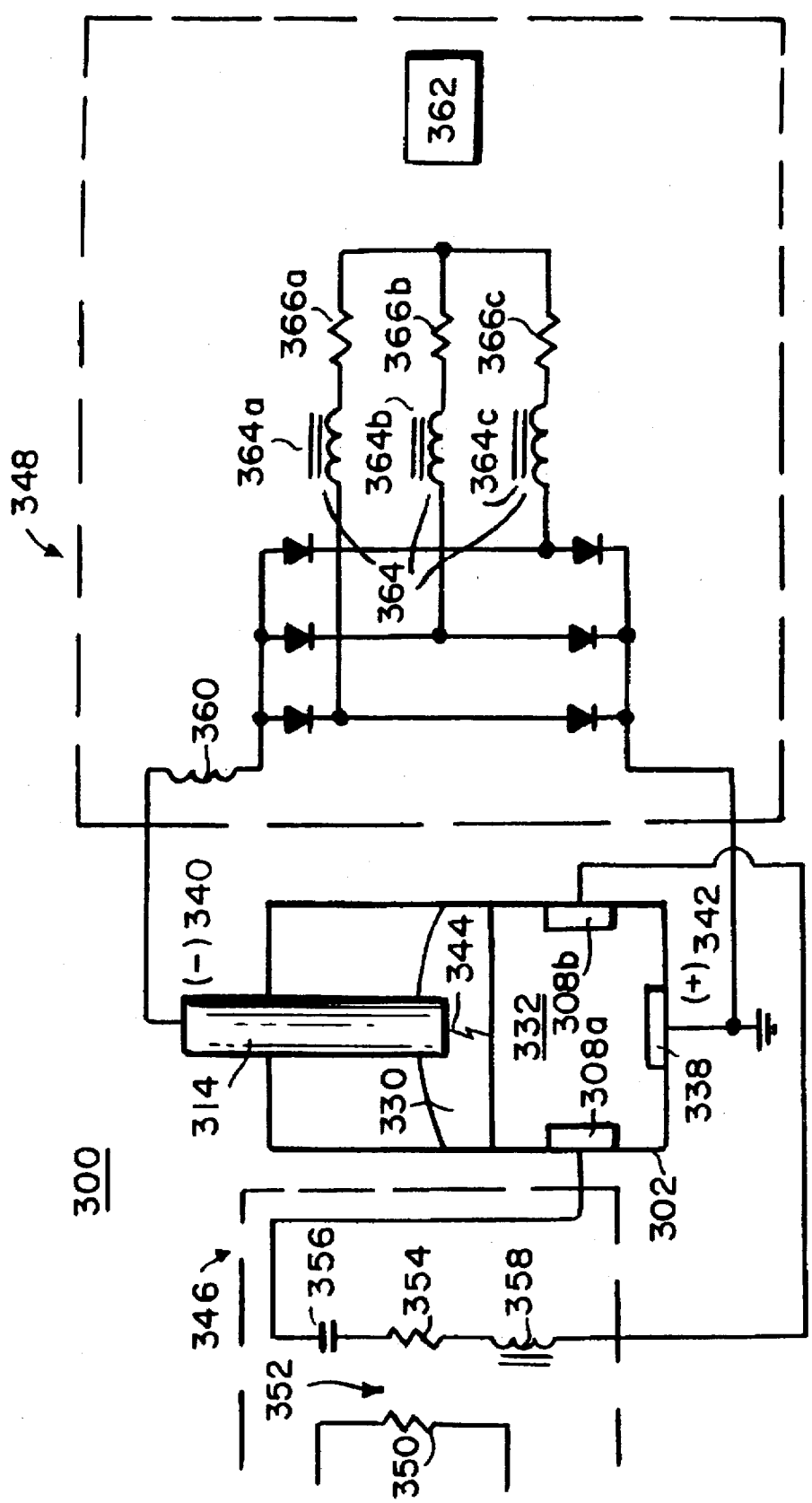
FIG. 5 illustrates an integrated arc plasma furnace and joule heated melter system with power delivery systems.

An alternative preferred embodiment of the invention is shown in FIGS. 4–8. In this embodiment, the DC are and the AC joule heated electrical systems are fully integrated and operated simultaneously in a single glass melt, but are isolated from one another through the use of a special power delivery circuit. The arc plasma-melter illustrated in FIGS. 4 and 5 is thus integrated both thermally and electrically, while the arc plasma furnace coupled to the joule heated melter illustrated in FIGS. 1 and 2 is thermally coupled. The embodiment of the invention shown in FIGS. 4–8 includes a circuit arrangement which allows passage of the required AC power through the melt using submerged electrodes as in standard conventional joule heated melters, and which also allows simultaneous operation of a DC arc plasma circuit through the melt between upper movable electrodes or, if desired, between these electrodes and a submerged counter electrode. The type of waste and the character of the molten slag will determine the preferred operating mode.

The integrated arc plasma-melter unit 300 is shown in FIG. 4 and includes reaction vessel 302. Integrated unit 300 may also include auxiliary heater 320.

Reaction vessel 302 includes top 302a, bottom 302b, and sides 302c and 302d. Bottom 302b may have a generally V-shaped configuration as illustrated in FIG. 4. Reaction vessel 302 further includes at least one port or opening 304a for introducing waste material 330 into reaction vessel 302. In a preferred embodiment, reaction vessel 302 includes a plurality of ports or openings 304a and 304b as shown in FIG. 4. Ports 304a and 304b may include a flow control valve or the like to control the flow of waste material 330 into vessel 302 and to prevent air from entering vessel 302 therethrough. It is also preferred that such ports 304a and 304b be capable of being controlled such that one or more can be selectively utilized separately or simultaneously with one or another. Reaction vessel 302 also includes gas port or opening 306 and metal/slag pouring port or opening 310. As discussed above with reference to FIG. 1, gas exiting from port 306 preferably will enter line 30 (as shown in FIG. 1) and will be sent to a scrubber, turbine or the like for further processing. Port 306 is provided with a flow control valve or the like so that gas formed in reaction vessel 302 may be selectively released into line 30. Metal/slag port 310 operates in a manner similar to that of port 28 shown in FIG. 1. In particular, port 310 is designed to have a flow control valve or the like so that metal and/or slag may be removed and introduced into metal/slag collector 312 at predetermined periods of time during the process. When hazardous waste is being processed, it may be desirable to have collector 312 sealably connected to port 310 in a manner such that air and/or gases do not enter or exit the system therethrough.

Auxiliary heater 320 functions similarly to auxiliary heater 90 shown in FIG. 2. In particular, due to differences in specific gravity, metal in metal/slag layer 332 moves toward bottom 302b in vessel 302. Slag in metal/slag layer 332 exits through opening or port 326a into conduit 326. Slag 334 is heated further by auxiliary heaters 322a and 322b for a time sufficient to provide a homogeneous slag product. Slag 334 then passes through slag pouring conduit 324 and port 328, thereby exiting auxiliary heater 320 into slag collector 336. When hazardous waste is being processed, it may be desirable to have collector 336 sealably connected to port 328 in a manner such that air and/or gases do not enter or exit the system therethrough.

Reaction vessel 302 also includes a plurality of AC joule heating electrodes 308a and 308b. As further shown in FIG. 4, electrodes 308a and 308b are preferably positioned across from one another on sides 302c and 302d, respectively. In addition, electrodes 308a–308b are positioned so as to be submerged in slag/metal 332 mix when the process is in use.

DC electrodes 314a and 314b are provided within reaction vessel as shown in FIG. 4. As shown in FIG. 5, electrodes 314a and 314b supply arc 344 which contacts feed material 330. One or more additional electrodes 338 may be provided as shown in FIGS. 4 or 5 such that positive (−) 340 and negative (+) 342 outputs are formed thereby.

One configuration of integrated system 300 involves the use of capacitors 356 and a specific arrangement in the distribution of power. As shown in FIG. 5, a single phase joule heated arc plasma-melter 302 having a single pair of electrodes 344 and 338 for arc 314 is illustrated. Preferably, the joule heated portion of melter 302 utilizes AC power supply 346 while the arc portion of melter 302 utilizes DC power supply 348.

The embodiment shown in FIG. 5 utilizes the combination of the DC and AC power systems 348, 346 respectively, supplying power to electrodes in the single vessel or melter tank 302 in which waste material 330 is undergoing treatment by a conversion process, including vitrification. A special circuit is necessary because DC arc electrodes 314, 338 will interact with joule heating AC electrodes 308a, 308b unless special steps are taken to prevent such interaction with and failure of the transformers which provide power to the joule heating electrodes. If single- phase, two-phase, or three-phase arcing electrodes are utilized instead of DC arcing electrodes, there may still be interaction between the AC arc circuit and the joule heating AC circuit. While the AC-AC interaction is quite complex, there are many dependent interactions which can occur, and under these circumstances, it is often difficult to control localized heating and electrode erosion. Accordingly, it is preferred to utilize a DC arc circuit in combination with a joule heated AC circuit.

DC power supply 348 includes inductor 360, primary winding 362, secondary windings, 366a, 366b and 366c and saturable reactors 364a, 364b and 364c. Primary winding 362 is preferably delta. Saturable reactors 364a, 364b and 364c are connected in series respectively with secondary windings 366a, 366b and 366c.

If DC current 348 passes through waste material 330 and slag/metal melt pool 332 having submerged joule heating AC electrodes 308a, 308b connected directly to the terminals of transformer 352 with no means of blocking the flow of DC current 348 through the windings of transformer 352, the core of transformer 352 saturates. This results in increased current in primary winding 350 of transformer 352 causing transformer 352 to fail in a very short time period. In order to simultaneously operate the arc plasma and the joule heated melter in vessel 302, it therefore is necessary to continue to pass AC current 346 through melt pool 332 for joule heating, while simultaneously blocking DC current flow 348. Capacitor 356 is utilized to block DC current 348 and pass AC current 346. Capacitor 356 preferably is connected in series with each transformer secondary winding 354 in order to balance the current in each of the phases over a wide range of furnace operating conditions. As further shown in FIG. 5, capacitor 356 is connected to secondary winding 354, which is connected to saturable reactor 358.

Figure 6A:
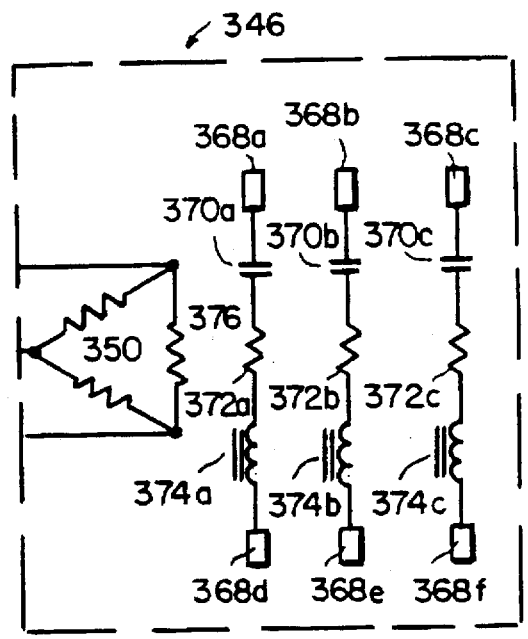
FIGS. 6(a) and 6(b) respectively show an AC power system and a DC power system for use with the integrated system shown in FIG. 5.
Figure 6B:
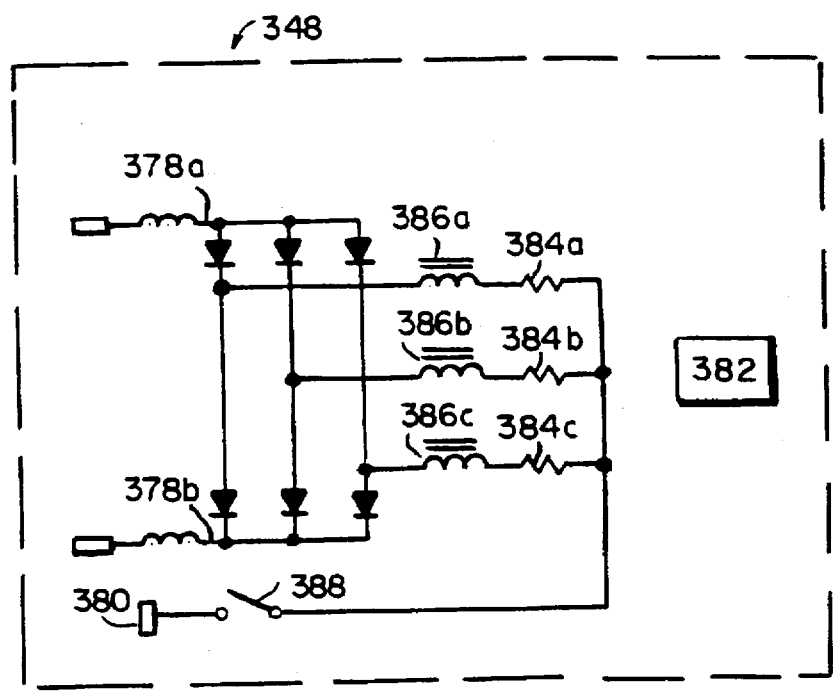

FIGS. 6(a) and 6(b) show a circuit arrangement which is suitable for use in the present invention. In particular, three phase AC power supply 346 is illustrated in FIG. 6(a) while DC power supply 348 is illustrated in FIG. 6(b). The circuit includes the inductance of each AC current path in vessel or melter 302 as reflected through the entire AC power system 346, the non-linear resistance of the current path through melt pool or molten bath 332, the electrode interfaces, the power feed cables, and secondary windings 372a, 372b and 372c of transformer 376 and the magnitude of the capacitance of capacitors 370a, 370b and 370c which is connected as a series element in the joule heating furnace circuit. AC power 346 also includes primary winding 350, saturable reactors 374a, 374b and 374c and electrodes 368a–368f. Saturable reactors 374a–374c are connected respectively to secondary windings 372a–372c.

Because the AC current is rarely sinusoidal in a circuit having in series a non-linear resistor such as the joule heating furnace circuit, it is possible to excite several harmonic frequencies other than 60 Hertz, which are superimposed on the 60 Hertz sine wave supplied by the utility company. In this circuit, it is important to account for the non-linear resistance and to specify the electrical components to achieve adequate damping and therefore stable operation. It is also important that the voltage, current, and capacitance ratings of the capacitor are such that the series resonant frequency of the entire system inductance at the furnace electrodes is such that the lowest value of resistance as seen at these same electrodes when looking into the furnace plus the effective 60 Hertz resistance is equal to or greater than 1.5 and preferably 2 times greater than the $(L/C)^{1/2}$ where L is the total inductance of the power system and C is the capacitance of capacitors 370a, 370b and 370c. The total effective resistance R should be 2 times $(L/C)^{1/2}$, but any resonant rise in current is negligible if this is 1.5 times $(L/C)^{1/2}$.

As shown in FIG. 6(b), DC electrical system 348 may have a power transformer with a wye or delta secondary winding 384a–384c. Primary winding 382 is preferably delta. As also shown in FIG. 6(b), the power rectifier is preferably a three-phase full wave rectifier. The rectifier may be a current controlled thyristor rectifier as shown in FIG. 3(a), i.e., a silicon-controlled rectifier in which the anode-cathode current is controlled by a signal applied to a third electrode. Alternatively, the rectifier may be three-phase full wave diode rectifier with the DC current control to maintain the desired DC current such as that illustrated in FIG. 3(b). If a thyristor rectifier is utilized, it is important that a full-rated current floating diode be placed across DC output terminals 378a, 378b. It is not necessary to add a DC "floating" or "clamping" diode when using a three-phase rectifier since the diodes in the rectifier will suffice.

For a DC arc furnace, it is preferable to use a three-phase full wave diode rectifier with saturable reactor control 386a–386c. Regardless of which type of power supply is used, it is important that an inductor is connected in series with the DC power lead which is not grounded. This reactor is necessary to rapidly supply the energy when the furnace conditions are such that the DC arc voltage suddenly increases.

If the bottom of the inside of furnace or melter 302 is made of suitable refractory such as ceramic or the like and is a poor electrical conductor when hot, counter electrode 380 may be formed by depressing a portion of the floor of furnace 302 between joule heating electrodes 368a–368f and then slightly elevating the molten metal drain tube so that a pool of metal remains in this depression in the furnace floor even after the metal is drained. This metal may act as a counter electrode 380 for the AC joule heating circuit and may simultaneously be used as a DC arc circuit electrode.

Metallic furnace bottom electrode 380 may be connected using various configurations such as that shown by the circuit diagrams in FIG. 6(b). In any case, it is preferred to have one or more electrodes through the bottom of the furnace or melter. The electrodes may be graphite or metal. It should be noted that the circuits in FIG. 6(b) and FIG. 8 respectively include switches 388 and 436 in series with the electrical connection to metallic electrode 380 and 426. The function of these switches is to permit the DC arc or arcs to operate in either the transfer or non-transfer mode or a combination of both modes simultaneously.

If the physical configuration of furnace 302 (shown in FIG. 4–5) is suitable for the use of two independently positioned controllable electrodes, then the DC arc electrodes and the AC joule heating electrodes may be operated simultaneously with no detrimental electrical interaction but with beneficial interaction for vitrification of all types of waste, including hazardous wastes and hospital waste.

The electrode configurations in furnace or vessel 400 shown in the embodiments of the invention in FIGS. 7(a) and 7(b) are suitable for use for remote control installations. FIG. 7 illustrates two sketches showing different plan views for the furnace construction. FIG. 7(a) shows an elongated construction while FIG. 7(b) shows a round construction. While both configurations can use one, two, or more solid graphite electrodes, it is preferred to use the elongated configuration with two electrodes (as shown in FIG. 7(a)), since this design lends itself to two separate small diameter electrode elevating systems, each housed in its own cylindrical enclosure. Any or all of the joule heating electrodes 402a–402f can be connected to the series capacitor as counter electrodes 404a–404b for the DC arc system. Joule heating electrodes 402a–402f may also be connected in series with electrode 406. In this case, switch 388 is also included as shown in FIG. 6(b). By adjusting the amount of AC current such that its peak value exceeds that value of DC arc current carried by joule heating electrodes 404a–404f, there will always be a current reversal which will tend to minimize polarization at these electrodes.

Depending upon the type of waste material being processed, it may be desirable to connect DC power supply 412 system neutral 438 to AC joule heating electrodes 422a, 422e and 422c, which are the electrodes connected to AC capacitors 416a–416c respectively and which are used to block DC current flow through the secondary windings 418a–418c of the transformers as shown in FIG. 8. The connection of DC power supply 412 and AC power supply 410 is designated in FIG. 8 as line 438. The reason for using this connection is to provide three additional DC counter electrodes closer to the surface of melt pool 332 during warm up of the furnace so that neutral DC transfer current 428 can flow and assist in stabilizing the positive (+) and negative (−) DC arcs before the material directly above the counter electrode on the hearth has become sufficiently hot to conduct sufficient DC current to assist in stabilization of the DC arcs.

It is also desirable to have three switches 434a–434c in series with the neutral and electrodes 422a, 422b and 422c in order to control the magnitude of the DC and AC current between electrodes 422a–422f. AC power supply system 410 includes primary winding 414 and secondary windings 418a–418c connected respectively to saturable reactors 420a–420c. DC power supply 412 includes inductors 424a, 424b and secondary windings 430a–430c connected respectively to saturable reactors 432a–432c.

Joule heating AC power supply 410 of a glass melt tank provides near constant melt temperatures throughout the glass tank, thereby minimizing sizing constraints for the arc, i.e., arc power, electrode diameter, and the like. The DC arc is primarily present in the furnace-melter for feed rate enhancement. This makes this newly configured melter technology more flexible than any other available vitrification system. The arc supplies the energy in the unmelted overburden of incoming feed, and the joule heated portion of the melter system maintains the hot glass pool to ensure complete dissolution and mixing of the glass mixture.

If the arc technology was used alone, the electrode hearth diameter ratio would have to be large to ensure that the contents in the hearth are melted sufficiently not only at the center of the hearth, but also at the walls of the hearth. The size of the hearth therefore would be limited due to practical limitations on electrode diameter. When the hearth or glass tank is joule heated, however, this limitation no longer exists and the tank can be sized to ensure the residence time is adequate for complete mixing and dissolution of all glass components.

If the melter technology were employed without the arc, the feed rates would be much lower due to limitations in heat transfer from the melt pool to the unmelted feed above the molten glass. To accommodate large throughput requirements, the standard approach is to increase the melt surface area. Accordingly, for a given processing rate, the joule heated melter would need to be much larger than the combined arc melt system of the present invention. The present invention utilizes the benefits of both the DC arc and AC joule heated melter technologies, and does so in a single optimized system.

Multiple arc electrodes may be used to start or restart this combined system, but once the melt is heated, joule heating may be used to maintain a molten bath during long idling periods. This means that the arc may be initiated immediately in the transferred mode for start or restart of arc operations.

The combination of the arc plasma furnace and joule heated melter in accordance with the present invention provides a method of quickly heating feed waste material resulting in higher processing rates for a given sized process. The fast heating rate also results in the production of a higher quality of pyrolysis gas. More energy is recovered and there are less pollutants in the gas emissions. Additionally, the joule heated melter of the present invention provides a larger reservoir with demonstrated mixing to produce a homogeneous glass product with very high stability. This is beneficial since vitrified glass product is stable over geologic time frames. See e.g., Buelt et al., *In Situ Vitrification of Transuranic Wastes: Systems Evaluation and Applications Assessment*, PNL-4800 Supplement 1, Pacific Northwest Laboratory, Richland, Wash. (1987).

Additionally, the present invention provides further volume reduction through the vitrification of the ash as compared with that ash that would be generated from incineration alone. See, Chapman, C., *Evaluation of Vitrifying Municipal Incinerator Ash*, Ceramic Nuclear Waste Management IV, Ceramic Transactions, G. G. Wicks, Ed., Vol. 23, pp.223–231, American Ceramic Society (1991).

As discussed above, the present invention provides a method which utilizes fast pyrolysis. This is a distinct advantage over prior art processes since fast pyrolysis results in a pyrolysis gas having higher purity than other means of pyrolysis. The high purity gas facilitates use with gas turbine technology, thereby significantly increasing efficiency as compared with conventional steam turbines and decreasing the unit size of the turbine required. The DC arc provides a high temperature heat source to accomplish the fast pyrolysis effectively. Graef, et at., *Product Distribution in the Rapid Pyrolysis of Biomass/Lignin for Production of Acetylene*, Biomass as a Nonfossil Fuel Source, American Chemical Society (1981) have shown that under conditions such as those found in a plasma furnace, municipal solid waste can be pyrolyzed into a gaseous product as shown in Table 1.

TABLE 1

| Gas Composition from Pyrolysis of MSW in Plasma Furnace. | | |
|---|---|---|
| Percent Conversion to useful gas for combustion | Fast Pyrolysis >65% | Normal Pyrolysis 45%–50% |
| Gas Species | Fast Pyrolysis | Normal Pyrolysis |
| $CO_2$ | 2% | 10% |
| CO | 44% | 50% |
| $H_2$ | 43% | trace |
| $CH_4$ | 2% | 38% |
| Light HC's | bal | bal |
| HHV (BTU/SCF) | 350–400 | 300–350 |

It is important to note that in comparing normal pyrolysis to that of fast pyrolysis, a greater fraction of the incoming waste is converted to gas. Thermal or normal pyrolysis promotes liquefaction giving only 45–50% conversion to pyrolysis gases, while fast pyrolysis has gas yields of greater than 65%. Fast pyrolysis of municipal waste has been demonstrated using a water cooled, metal plasma torch. See, Carter, et al., *Municipal Solid Waste Feasibility of Gasification with Plasma Arc, Industrial and Environmental Applications of Plasma*, Proceedings of the First International EPRI Plasma Symposium (May 1990). In the partial oxidation mode of operation, the residue from both techniques is oxidized to offset the pyrolysis energy requirements.

The pyrolysis gases produced in accordance with the present invention are well suited for combustion in a standard gas fired turbine generator. With the efficiency of new gas turbines approaching 50%, the present method of waste-to-energy conversion provides an effective alternative to standard waste incinerators. Under favorable conditions, the incinerator-steam generator systems achieve 15–20% efficiency in the conversion of the potential energy contained in the waste to usable electric energy.

A prophetic illustrative comparison of the complete waste conversion system of the present invention to that of standard incinerator-steam generator systems is summarized in Table 2.

TABLE 2

Relative Energy Balances and Net Cost Information for Arc Furnace and Joule Heated Melter vs. Standard Incinerator-Steam Generator Technology (Basis = 1 ton MSW).

|  | Arc Furnace-Melter | Incinerator |
|---|---|---|
| Energy requirements to operate system | $2.1 \times 10^6$ BTU | — |
| HV in Incoming MSW | $1 \times 10^7$ BTU | $1 \times 10^7$ BTU |
| Losses | $3.1 \times 10^6$ BTU | $8.8 \times 10^6$ BTU |
| HV in Exiting Gas | $9 \times 10^6$ BTU | — |
| Efficiency for electrical conversion | 0.4 | 0.15 |
| Net Energy (Electric Produced) | $1.5 \times 10^6$ BTU | $1.5 \times 10^6$ BTU |
| Value of Electricity ($0.05/Kwh) ($) | 22.00 | 22.00 |
| Disposal Costs including transportation | — | 15.00 to 75.00 |
| Net Cost/income ($) | (+) 22.00 | (+) 7.00 to (−) 53.00 |

HV = heat value; MSW = municipal solid waste.

An assumption is made for the comparison of the two technologies, namely that the glass or slag product produced in the arc furnace of the present invention is a useful product, although no value has been assigned to the glass for this comparison. At a minimum, however, this material is a stable nonhazardous material that can be easily disposed of in any landfill. It is also assumed that the municipal solid waste (MSW) incinerator employed in a highly populated area such as the Northeastern United States produces ash that either must be shipped to a standard landfill or a hazardous waste landfill. Energy and cost are given per ton of MSW processed based on currently available data.

The energy requirements to operate the system are given in a relative bases, i.e., the value shown "energy requirements to operate system" for the arc furnace-melter is that in excess of what is required for the incinerator. The incoming heating value of the waste is a composite value from multiple references. See e.g., Carter, et al., *Municipal Solid Waste Feasibility of Gasification with Plasma Arc, Industrial and Environmental Applications of Plasma*, Proceedings of the First International EPRI Plasma Symposium (May 1990); *Renewable Energy- Sources for Fuels and Energy*, Johansson, Editor, Island Press, Washington, D.C. (1993); and *Clean Energy from Waste & Coal*, Khan, Editor, American Chemical Society Symposium Series, American Chemical Society, Washington, D.C. (August 1991, published 1993). The net energy produced for either option was determined using a 40% and 15% efficiency for the arc furnace-melter-gas turbine generator, and incinerator-boiler-steam turbine generator options, respectively. See, *Clean Energy from Waste & Coal*, Khan, Editor, American Chemical Society Symposium Series, American Chemical Society, Washington, D.C. (August 1991, published 1993); and *Perry's Chemical Engineers' Handbook*, 6th Ed., Ch. 26. The losses presented in Table 2 are the difference between incoming heat value in the waste and the energy input minus the net energy out. Losses for the incinerator option are higher due to the inefficiencies of the combination of the boiler and steam generator as opposed to pyrolysis gas fired turbine generators. See, *Perry's Chemical Engineers' Handbook*, 6th Ed., Ch. 26. The disposal costs for the ash represent values obtained from literature and data currently available from waste handling facilities. See e.g., *Recycling and Incineration*, Dension, et al., Ed., Island Press, Washington, D.C. (1990). If new rulings and current trends involving the handling of ash as a hazardous waste continue, the disposal costs would be in the high end of the range given in Table 2. Under these circumstances, the present invention of utilizing the are furnace-melter combination provides an additional advantage over the prior art.

It should be appreciated by those skilled in the art that the specific embodiments disclosed above may readily be utilized as a basis for modifying or designing other structures for carrying out the same purpose of the present invention. It should also be realized by those skilled in the art that such equivalent constructions do not depart from the spirit and scope of the invention as set forth in the appended claims.

What is claimed is:

1. A waste conversion unit, comprising:
   an arc plasma furnace having at least one electrode in a predetermined position therein, the arc plasma furnace characterized in that at least a portion of waste material received therein forms a slag; and
   a joule heated melter coupled to the arc plasma furnace, the joule heated melter configured to receive at least a portion of the slag from the arc plasma furnace,
   wherein the arc plasma furnace portion of the unit is configured to provide a predominant source of heat for the waste material to be treated in the unit relative to heat provided by the joule heated melter.

2. The waste conversion unit as defined in claim 1, wherein the joule heated melter is directly coupled to the arc plasma furnace.

3. The waste conversion unit as defined in claim 1, wherein the at least one electrode is a graphite electrode.

4. The waste conversion unit as defined in claim 3, wherein the at least one electrode operates with an AC arc.

5. The waste conversion unit as defined in claim 3, wherein the at least one electrode operates with a DC arc.

6. The waste conversion unit as defined as defined in claim 3, 4, or 5, wherein the at least one electrode includes a protective coating.

7. The waste conversion unit as defined in claim 3, 4, or 5 further including an auxiliary heating unit coupled to the joule heated melter.

8. The waste conversion unit as defined in claim 1, wherein the arc plasma furnace includes an interior refractory lining along the periphery of the arc plasma furnace.

9. The waste conversion unit as defined in claim 8, wherein the refractory is formed of ceramic.

10. The waste conversion unit as defined in claim 1, wherein the joule heated melter is heated by an AC power supply source.

11. The waste conversion unit as defined in claim 10, wherein the AC power supply source is connected to a plurality of electrodes at predetermined positions in the melter.

12. The waste conversion unit as defined in claim 11, wherein two electrodes are positioned on two side surfaces of the melter at predetermined distances from a bottom surface of the melter.

13. The waste conversion unit as defined in claim 12, further including an electrode positioned proximate to the bottom surface of the melter.

14. The waste conversion unit as defined in claim 1, wherein the joule heated melter is heated by a DC power supply source.

15. A system for converting waste material, comprising:
   an arc plasma furnace, the arc plasma furnace comprising:
      at least one arc plasma electrode in a predetermined position therein;
      a first discharge port positioned to discharge metal from the furnace; and a second discharge port positioned to discharge gases and slag from the furnace;

a joule heated melter attached to the arc plasma furnace, the melter including a gas discharge port positioned to discharge gases therefrom, and a slag discharge port in a predetermined position therein;

means for feeding the waste material into the arc plasma furnace such that a metal layer, a slag layer and a gaseous phase is formed in the arc furnace;

a gas clean-up unit attached to the melter, the gas clean-up unit capable of separating the gaseous phase from the melter into fuel gas and particulate matter;

a combustor attached to the gas clean-up unit;

means for providing air to the system at a predetermined rate;

a turbine attached to the combustor;

a generator attached to the turbine; and a heat recovery steam system attached to the turbine.

16. The waste conversion system as defined in claim 15, wherein the melter is directly coupled to the arc plasma furnace.

17. The waste conversion system as defined in claim 15, wherein the at least one arc plasma electrode is a graphite electrode.

18. The waste conversion system as defined in claim 17, wherein the at least one arc plasma electrode operates with an AC arc.

19. The waste conversion system as defined in claim 17, wherein the at least one arc plasma electrode operates with a DC arc.

20. The waste conversion unit as defined in claims 17, 18 or 19, wherein the at least one arc plasma electrode includes a protective coating.

21. The waste conversion system as defined in claim 16, 17, 18 or 19, further including an auxiliary heating unit coupled to the joule heated melter.

22. The waste conversion system as defined in claim 15, wherein the furnace includes an interior refractory lining along the periphery of the furnace.

23. The waste conversion system as defined in claim 22, wherein the refractory is formed of ceramic.

24. The waste conversion system as defined in claim 15, wherein the melter is joule heated by an AC power supply source.

25. The waste conversion system as defined in claim 24, wherein the AC power supply source is connected to a plurality of electrodes at predetermined positions in the melter.

26. The waste conversion system as defined in claim 15, wherein the melter is joule heated by a DC power supply source.

27. A process for converting waste material, comprising:
(a) introducing the waste material into an arc plasma positioned within an arc plasma furnace having first and second discharge ports at predetermined positions therein;
(b) contacting the waste material with the arc plasma whereby the waste material is separated into a metal layer, a slag layer and a gaseous phase;
(c) feeding the gaseous phase and the slag layer through the second discharge port from the arc plasma furnace to a joule heated melter connected to the arc plasma furnace, the joule heated melter having gas and slag discharge ports positioned therein; and
(d) mixing the slag layer in the joule heated melter for a predetermined time period, thereby forming a slag product.

28. The process as defined in claim 27, wherein the arc plasma includes at least one electrode.

29. The process as defined in claim 28, wherein the at least one arc plasma electrode is a graphite electrode.

30. The process as defined in claim 28 or 29, wherein the at least one electrode includes a protective coating.

31. The process as defined in claim 27, wherein the separation includes fast pyrolysis.

32. The process as defined in claim 27 or 31, wherein the gaseous phase includes at least one of: hydrogen, carbon monoxide, methane, carbon dioxide and light hydrocarbons.

33. The process as defined in claim 27 or 31, wherein the slag layer contains glass.

34. The process as defined in claim 33, wherein the slag layer is removed from the melter and is formed into a vitrified product.

35. The process as defined in claim 34, wherein the vitrified product is suitable for use in construction of roads.

36. The process as defined in claim 34, wherein the vitrified product is suitable for use as a component in building blocks.

37. The process as defined in claim 34, wherein the vitrified product is a nonleachable product suitable for storage in a landfill.

38. The process as defined in claim 27, wherein the waste material is municipal solid waste.

39. The process as defined in claim 27, wherein the waste material is hazardous waste.

40. The process as defined in claim 27, wherein the waste material is hospital waste.

41. The process as defined in claim 27, further including removing the metal layer from the arc plasma furnace.

42. The process as defined in claim 27, further including:
(e) removing the gaseous phase from the gas discharge port in the melter.

43. The process as defined in claim 42, further including:
(f) treating the gaseous phase in a gas clean-up system such that particulates in the gaseous phase are separated therefrom and a fuel gas is thereby provided;
(g) feeding the fuel gas to a combustor;
(h) introducing air into the combustor substantially simultaneously with step (g), whereby combustion products are formed from the fuel gas and the air; and
(i) feeding the combustion products to a turbine generator, whereby the combustion products drive the turbine generator to generate electricity.

44. The process as defined in claim 43, wherein the turbine generator includes a steam or water injected gas turbine.

45. The process as defined in claim 43, wherein the process further includes:
feeding gases from the turbine generator to a scrubber to remove acid gases therefrom.

46. The process as defined in claim 45, wherein the turbine generator includes a steam or water injected gas turbine.

47. A process for converting waste material, comprising:

(a) introducing the waste material into an arc plasma furnace having first and second discharge ports at predetermined positions therein and at least one arc plasma electrode positioned therein;

(b) contacting the waste material with the arc plasma electrode such that the waste material is separated into a metal layer, a slag layer and a gaseous phase;

(c) feeding the gaseous phase and the slag layer through the second discharge port in the furnace to a joule heated melter connected to the arc plasma furnace, the joule heated melter having gas and slag discharge ports at predetermined positions therein;

(d) mixing the slag layer in the joule heated melter for a predetermined time period, thereby producing a slag product;

(e) removing the gaseous phase from the melter through the gas discharge port therein;

(f) treating the gaseous phase in a gas clean-up system such that particulates in the gaseous phase are separated therefrom and a fuel gas is provided thereby;

(g) feeding the fuel gas to a combustor;

(h) introducing air into the combustor substantially simultaneously with step (g), whereby combustion products are formed from the fuel gas and the air; and (i) feeding the combustion products to a turbine generator, whereby the combustion products drive the turbine generator to generate electricity.

48. A waste conversion unit, comprising:

a transfer arc plasma furnace having at least one electrode in a predetermine position therein, the arc plasma furnace characterized in that at least a portion of waste material received therein forms a slag; and a joule heated melter coupled to the plasma furnace, the joule heated melter configured to receive at least a portion of the slag from the arc plasma furnace, wherein the transfer arc plasma furnace portion of the waste conversion unit is configured to provide a predominant source of heat for the waste material to be treated in the unit relative to heat provided by the joule heated melter.

* * * * *

UNITED STATES PATENT AND TRADEMARK OFFICE
CERTIFICATE OF CORRECTION

PATENT NO. : 5,666,891

DATED : September 16, 1997

INVENTOR(S) : Charles H. Titus, Daniel R. Cohn and Jeffrey E. Surma

It is certified that error appears in the above-identified patent and that said Letters Patent is hereby corrected as shown below:

Column 5, line 63: please delete "mount"; and insert therefor --amount--.

Column 8, line 9: please delete "must".

Column 10, line 27: please delete "positive"; and insert therefor --negative--.

Column 10, line 28: please delete "negative"; and insert therefor --positive--.

Column 10, line 33: please delete "344"; and insert therefor --314--.

Column 10, line 33: please delete "314"; and insert therefor --344--.

Column 12, line 29: please delete "FIG."; and insert therefor --FIGS.--.

Column 13, line 7: please delete "422b"; and insert therefor --422e--.

UNITED STATES PATENT AND TRADEMARK OFFICE
CERTIFICATE OF CORRECTION

PATENT NO. : 5,666,891
DATED : September 16, 1997
INVENTOR(S) : Charles H. Titus, Daniel R. Cohn and Jeffrey Surma It is certified that error appears in the above-identified patent and that said Letters Patent is hereby corrected as shown below:

In claim 45, line 3:   before "feeding"; insert --(j)--.

Signed and Sealed this

Ninth Day of June, 1998

Attest:

BRUCE LEHMAN

Attesting Officer

Commissioner of Patents and Trademarks